Jan. 7, 1969 M. E. MILLER 3,420,534

PHONOGRAPH PICKUP

Filed June 7, 1967

INVENTOR
MICHAEL E. MILLER

BY Eugene M. Whitacre

ATTORNEY

United States Patent Office 3,420,534 Patented Jan. 7, 1969

3,420,534
PHONOGRAPH PICKUP
Michael E. Miller, Indianapolis, Ind., assignor to Radio Corporation of America, a corporation of Delaware
Filed June 7, 1967, Ser. No. 644,333
U.S. Cl. 274—37 10 Claims
Int. Cl. G11b *3/02*

ABSTRACT OF THE DISCLOSURE

In a phonograph pick-up, the yoke member and stylus beam carrying damping member are positioned such that a surface of the reentrant beam engaging portion of the yoke member abuts the forward end surface of the damping block, thereby to provide a fixed and predetermined $L_1/L_2$ ratio.

Figures 1, 2:
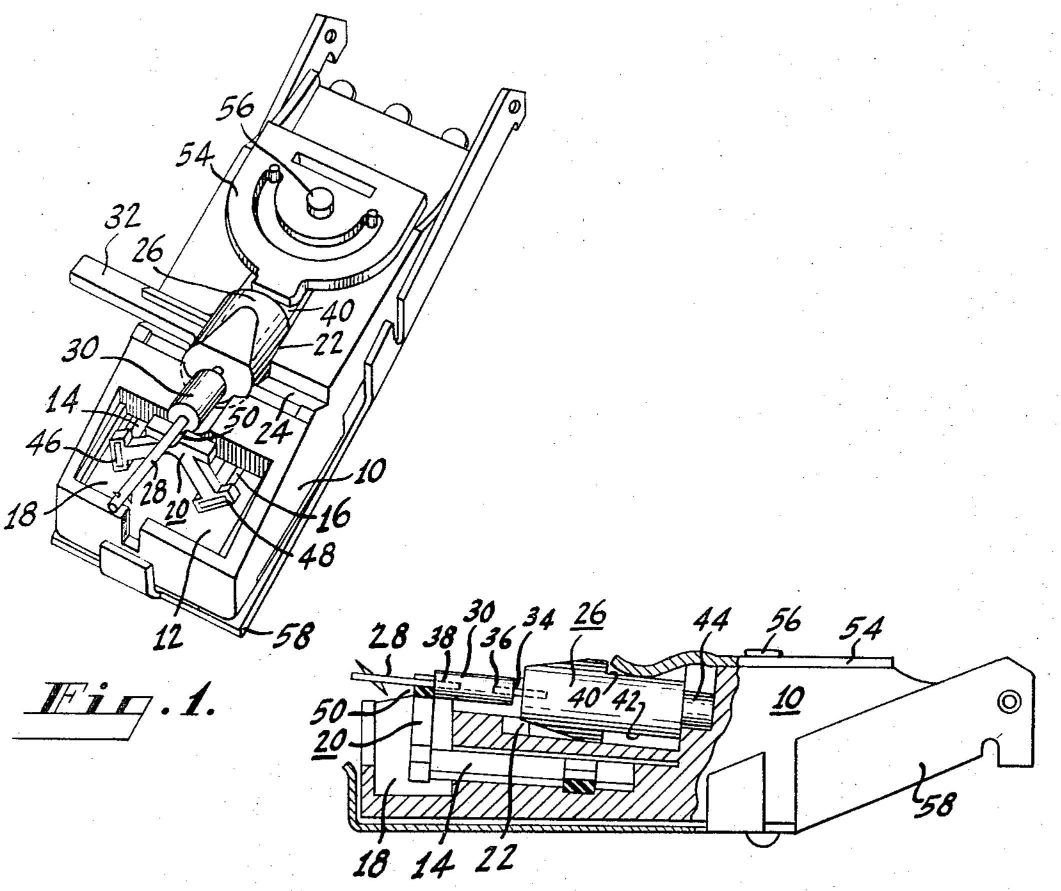

This invention relates to phonograph pickups, and more particularly to improved structures and arrangements therein.

An example of a present day phonograph pickup includes one or more mechanical-to-electrical transducers, such as piezo-electric devices, carried by a support housing. The housing is adapted for fastening to a pickup arm. A beam member is mounted to the housing and provided at its free extremity with a stylus shaped to engage the groove of a disc recording while the disc is rotated on a turntable. Means are provided in the pickup for mechanically coupling the beam member to the piezo-electric crystal. Motion of the stylus in tracing the undulations of the disc grooves is thereby communicated to the piezo-electric device and the resulting changes in its characteristics sensed and transformed into electrical signals.

To minimize wear on the material from which a record is made, the effective moving mass of the stylus should be as low as possible and the compliance of the beam to which it is attached should be as high as possible. Furthermore, if the electrical signals ultimately produced are to faithfully reproduce the recorded sound, the mechanical system comprising the stylus, beam and piezo-electric element should be free of mechanical resonances within the range of sound frequencies recorded on the disc. Thus, if the beam is directly coupled to the piezo-electric device at or near the stylus extremity thereof, the stiffness of the device is directly imposed on the stylus. Its effective mass is, therefore, high and its compliance low, resulting in undue record wear. On the other hand, if the beam is coupled to the piezo-electric device at a position on the beam remote from the stylus end and adjacent to its support structure mounting end, various mechanical resonances are invited and the output signal from the pickup is reduced.

Ideally, it is desirable to couple the beam to the piezo-electric device at some intermediate position on the beam remote from the stylus end and near the mounted end. Practical design would have the ratio of the length of the beam ($L_1$) to the length of the portion of the beam ($L_2$) between its mounted end and the point at which it is coupled to the piezo-electric crystal greater than 2. The length of $L_1$ is easy to maintain accurately, but the length of $L_2$ is hard to maintain since within normal manufacturing tolerances, the point at which the beam is coupled to the piezo-electric crystal varies from pickup to pickup. If the ratio $L_1/L_2$ varies, the compliance and output of the pickups will vary resulting in a nonuniformity in their performance characteristics.

An object of the present invention is to provide an improved phonograph pickup of simplified construction and which can be easily manufactured at low cost using mass production techniques.

Another object of the present invention is to provide an improved phonograph pickup adaptable to receive a replacement stylus assembly and provide substantially the same performance therewith as with the original stylus assembly.

In accordance with the present invention a phonograph pickup of the type having a pickup housing supporting a mechanical-to-electrical transducer is provided with an elongated stylus beam supporting a stylus near one end. A predetermined length of the beam extending from its rear end is received within an opening in a resilient member seated in a support structure and carried on the housing. Means are provided for coupling movement of the stylus beam to the mechanical-to-electrical transducer within the housing at a position along the length of the beam remote from the stylus end such that a portion of the coupling means is contiguous with a surface of the beam receiving resilient member.

The novel features which are believed to be characteristic of the invention are set forth with particularity in the appended claims. The invention itself, however, both as to its organization and method of operation, together with further objects and advantages thereof, will be better understood from the following description considered in conjunction with the accompanying drawing in which:

FIGURE 1 is a perspective bottom view of a phonograph pickup embodying the present invention; and FIGURE 2 is a side view, partially in section, of the phonograph pickup shown in FIGURE 1.

In accordance with a preferred embodiment of the present invention there is shown in FIGURE 1 a phonograph pickup of the type adapted for stereophonic record reproduction when suitably mounted in the tone arm of a record player. The pickup includes a housing or casing 10 substantially rectangular in shape and preferably comprising two opposing sections of molded plastic defining an internal cavity 12 extending substantially the length of the casing 10, and in which a pair of piezo-electric transducing elements 14 and 16 are housed. The bottom portion of the casing 10 has a rectangularly shaped opening 18 near the front end which communicates with said internal cavity 12 and into which a yoke member 20 is positioned in a manner to be hereinafter detailed.

A recess 22 extends axially from the rectangularly shaped opening 18 part-way along the bottom portion of the casing 10. The axially extending recess 22 is crossed substantially at its midpoint by a recess 24 laterally extending across the bottom portion of the casing 10. As shown in FIGURE 1, the portion of the recess 22 between the opening 18 and the lateral recess 24 is made narrower and shallower than its remaining portion so as to provide a retaining shoulder for the holder portion 26 of a received stylus assembly as will be hereinafter described.

The stylus assembly may be considered to comprise three axially aligned members; a stylus beam member 28 carrying a pair of record engaging styli oppositely disposed near one end thereof, a cylindrically shaped damping member 30 made of an elastomer material such as rubber, and the holder 26 which is preferably a molded plastic piece. The holder 26 is seated in the recess 22 such that it may be rotated 180° about an axis substantially parallel to the major axis of the stylus assembly. The holder 26 is manually rotated by means of a lever arm 32 which extends laterally outward therefrom in a plane normal to the major axis of the casing. As shown particularly in FIGURE 2, the front end of the holder 26 is provided with an axially extending dowel-like projection 34 which is received in a mating bore 36 provided in the rear portion of the damping member 30. The rear end of the stylus beam 28 remote from the styli end is received in another or second mating bore 38 provided in the forward or front portion of the damping member 30. The second bore extends into the damping member a fixed distance so that a predetermined length of the stylus beam 28, as measured from its rear end may be received therein. The length of the central and non-bored portion of the damping member 30 is also of a fixed dimension and provides a pivot center for the stylus beam.

In other words, the damping member 30 provides a first portion for mounting a predetermined length of the stylus beam 28, a second and central portion about which the stylus beam may be pivoted during operation of the cartridge, and a third portion for coupling the beam to the holder 26. The resilience of the damping member inherently provides for substantial damping of the rear end of the stylus beam as well as damping of mechanical resonances that may appear in the system during operation of the pickup.

The end portion of the holder 26 remote from the damping member 30 is provided with a pair of flat surfaces 40 and 42 and a cylindrical bearing surface 44 in aixal alignment with the stylus beam 28.

The transducing elements 14 and 16 have a rectangular cross section and are mounted in the casing in accordance with known techniques, so that their major surfaces lie in perpendicular planes, with each plane disposed at an angle of 45° to a plane extending vertically through the longitudinal axis of the pickup casing 10.

The yoke member 20 is formed of an elastomer material and has a pair of divergent legs with apertures 46 and 48 for receiving the exposed ends of the respective transducing elements 14 and 16, and a slotted reentrant central portion 50 for receiving the stylus beam as shown more particularly in FIGURE 1. The divergent legs are stiff axially but flexible in directions normal to the axis. Thus, axial forces or vibrations imparted to either of the divergent legs will be transmitted to the associated transducing elements, thereby causing a bending torque on the transducing elements.

Suitable electrical connections (not shown) extend from the transducing elements to appropriate terminals arranged at the rear of the cartridge for connection to the input circuit of an external preamplifier.

The stylus beam assembly is positioned in the casing 10 so that the bearing surface 44 of the holder 26 fits into a conforming area of recess 22 and allows axial rotation of the stylus beam assembly. The forward part of the holder 26 abuts the shoulder formed at the point where the recess 22 narrows, and the arm 32 lays in the lateral recess 24 for either position thereof.

As shown in the figures, the stylus beam 28 is received in the slotted central portion 50 of the yoke member 20 at a position along the length of the stylus beam 28 such that a surface of the yoke member is contiguous with the forward end surface of the damping member 30 and so that one of the styli depends downwardly at an angle to engage a record groove. In other words, the forward end surface of the damping member is in abutting engagement with a facing surface of the yoke member control portion. In this manner the length ($L_2$) of the stylus beam measured from yoke coupling position to the rear end of the beam will be fixed and, of course, will be equal to the length of the beam received in the bored forward portion of the damping member 30.

The holder 26 is retained in the axial recess 22 by a leaf spring 54 which is secured to the bottom portion of the casing 10 by a rivet or screw 56. The rivet or screw 56 may also serve as a means for fastening the top and bottom portions of the casing 10 together in complementary relationship and affixed to a mounting bracket 58. The free end of the spring 54 is adapted to engage and cover one of the exposed flat surfaces 40 and 42 of the holder 26 by forming a detent therewith, thereby restraining said holder 26 from slipping out of the recess 22 while also allowing it to rotate between detents. In the present example, the spring 54 is made of a metal having sufficient resiliency to allow it to be deflected by the holder 26 when rotated and still maintain a strong retaining force to ensure that the holder 26 does not slip out of the recess 22.

Since the length ($L_2$) of the beam member received in the front portion of the damping member 30 is fixed and therefore will be constant from stylus assembly to stylus assembly, the ratio of the length ($L_1$) of the stylus beam to beam length ($L_2$) measured from the yoke member-coupling position to the rear end of the beam 28, can be easily controlled and maintained substantially constant from pickup to pickup.

To ensure that surface of the reentrant central portion 50 of the yoke coupling member is always in abutting engagement with the front end surface of the damping member 30, thereby to fix the $L_1/L_2$ ratio, the yoke member, while being positioned in the pickup casing at an angle such that it is substantially perpendicular to the axis of the beam member, is slightly biased against the front end surface of the damping member.

It will be apparent that if a replacement stylus assembly is needed for a pickup constructed in accordance with the present invention, the beam member in a replacement assembly will couple to the yoke member at a position along the beam member to provide substantially the same $L_1/L_2$ ratio as the original assembly, thereby assuring substantially the same performance as was obtained with the original assembly.

Thus, it will be seen that an improved phonograph pickup has been provided in which the beam coupling lengths ($L_1$, $L_2$) can be accurately controlled to provide for the manufacture of phonograph pickups having uniform performance characteristics using mass production techniques.

What is claimed is:

1. In a phonograph pickup of the type including a pickup housing supporting a mechanical-to-electrical transducer means, the combination of:

an elongated stylus beam including a stylus near one end thereof;

means carried on said housing and including a resilient member having an opening in one portion for receiving a predetermined length of the other end of said stylus beam; and means coupling said transducer means to said stylus beam at a position along the length of said beam and remote from said stylus such that a portion of said coupling means is contiguous with a surface of said resilient member.

2. In a phonograph pickup of the type including a pickup housing supporting a mechanical-to-electrical transducer means, the combination of:

an elongated stylus beam supporting a stylus near one end thereof;

a resilient member having an opening in one portion for receiving a predetermined length of the other end portion of said stylus beam;

a suport member carried on said housing for mounting the portion of said resilient member opposite said one portion of said stylus beam; and means coupling said transducer means to said stylus beam at a position along the length of said beam such that a portion of said coupling means is contiguous with said one portion of said resilient member.

3. The combination as defined in claim 2 wherein said coupling means comprises:

a member having a reentrant central portion and a pair of upwardly and outwardly diverging leg portions extending therefrom, the upper ends of said leg portions engaging said transducing means, and said reentrant central portion engaging said stylus beam, said member being positioned substantially perpendicular to the axis defining the length of said beam such that a surface of said reentrant central portion is contiguous with said resilient member surface.

4. In a phonograph pickup of the type including a pickup housing supporting a pair of mechanical-to-electrical transducers the combination comprising:

an elongated stylus beam including a stylus near one end thereof;

first means on said housing including a resilient damping block pivotally mounting the other end of said stylus beam; and second means including a yoke member coupling said stylus beam to said transducers, said member comprising a reentrant central portion and a pair of leg members diverging therefrom arranged in a plane substantially perpendicular to the length of said beam, said leg members having free ends, said free ends engaging respective ones of said transducers, said stylus beam being received in said reentrant central portion at a position along the length of said beam such that a surface of said central portion abuts up against a surface of said damping block.

5. The combination as defined in claim 4 wherein said stylus beam is received within said yoke member reentrant central portion at a position along the length of said stylus beam spaced a distance from said stylus end equal to more than one half the length of said stylus beam.

6. The combination as defined in claim 5 wherein said first means includes a holder rotatably seated in said housing and carrying said damping block.

7. The combination as defined in claim 6 wherein said damping block includes a forward portion mounting said beam, a resilient central portion defining a pivot for said forward portion mounted beam, and a rear portion fixedly carried by said holder.

8. The combination as defined in claim 7 wherein said damping block forward portion is cylindrical in shape and its forward end surface is the surface in abutting engagement with a facing end surface of said yoke member central portion.

9. The combination as defined in claim 8 wherein said damping block forward portion includes an opening into which a predetermined length of the other end of said stylus beam is received.

10. The combination as defined in claim 9 wherein the length of said beam received in said damping block is substantially less than one half the length of said stylus beam.

References Cited

UNITED STATES PATENTS 3,375,012 3/1968 Laux et al. ---------- 274—37

LEONARD FORMAN, *Primary Examiner.*

F. J. D'AMBROSIO, *Assistant Examiner.*